(12) United States Patent
Ramanathan

(10) Patent No.: US 9,697,501 B2
(45) Date of Patent: Jul. 4, 2017

(54) INTERRUPTIBILITY MANAGEMENT VIA SCHEDULING APPLICATION

(75) Inventor: Rajesh Ramanathan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1290 days.

(21) Appl. No.: 11/860,857

(22) Filed: Sep. 25, 2007

(65) Prior Publication Data

US 2009/0083742 A1    Mar. 26, 2009

(51) Int. Cl.
*G06Q 10/00* (2012.01)
*G06Q 10/10* (2012.01)

(52) U.S. Cl.
CPC ........... *G06Q 10/109* (2013.01); *G06Q 10/10* (2013.01); *G06Q 10/1093* (2013.01); *G06Q 10/1095* (2013.01)

(58) Field of Classification Search
CPC .... H04L 67/24; G06Q 10/00; G06Q 10/1095; G06Q 10/109; G06Q 10/1093
USPC ................................. 705/7.18, 7.19
See application file for complete search history.

(56) References Cited

U.S. PATENT DOCUMENTS

| | | | | |
|---|---|---|---|---|
| 6,052,563 A * | 4/2000 | Macko | | 340/7.1 |
| 6,345,281 B1 * | 2/2002 | Kardos et al. | | 700/100 |
| 6,360,243 B1 * | 3/2002 | Lindsley et al. | | 718/103 |
| 6,477,374 B1 * | 11/2002 | Shaffer | | H04M 7/006 379/211.02 |
| 7,251,696 B1 * | 7/2007 | Horvitz | | 709/228 |
| 7,493,369 B2 * | 2/2009 | Horvitz et al. | | 709/207 |
| 7,548,932 B2 * | 6/2009 | Horvitz et al. | | |
| 7,844,666 B2 * | 11/2010 | Horvitz et al. | | 709/206 |
| 7,848,505 B2 * | 12/2010 | Martin et al. | | 379/210.02 |
| 7,890,576 B2 * | 2/2011 | Button et al. | | 709/203 |
| 2002/0087649 A1 * | 7/2002 | Horvitz | | 709/207 |
| 2003/0007617 A1 * | 1/2003 | McAlinden | | H04M 3/54 379/201.02 |
| 2003/0046421 A1 * | 3/2003 | Horvitz et al. | | 709/238 |
| 2004/0028208 A1 * | 2/2004 | Carnazza | | H04M 3/42229 379/221.01 |
| 2004/0223599 A1 * | 11/2004 | Bear et al. | | 379/207.02 |
| 2004/0229600 A1 * | 11/2004 | Saez et al. | | 455/417 |
| 2004/0235520 A1 * | 11/2004 | Cadiz | | H04M 1/2473 455/557 |
| 2005/0020249 A1 * | 1/2005 | Seo | | 455/414.1 |
| 2005/0080848 A1 * | 4/2005 | Shah | | 709/204 |
| 2006/0148505 A1 * | 7/2006 | Liu et al. | | 455/521 |
| 2006/0177030 A1 * | 8/2006 | Rajagopalan et al. | | 379/142.07 |
| 2007/0211877 A1 * | 9/2007 | Martin et al. | | 379/210.02 |
| 2007/0276909 A1 * | 11/2007 | Chavda et al. | | 709/204 |
| 2008/0162615 A1 * | 7/2008 | Hurmola et al. | | 708/112 |
| 2009/0147937 A1 * | 6/2009 | Sullhan et al. | | 379/201.02 |
| 2009/0279683 A1 * | 11/2009 | Gisby et al. | | 379/201.02 |

(Continued)

*Primary Examiner* — Johnna Loftis
(74) *Attorney, Agent, or Firm* — Talem IP Law, LLP

(57) ABSTRACT

A system and methodology that facilitates management of user accessibility via a scheduling application is provided. A user can link or map interruptability levels to schedule entries, such as calendar entries or tasks thereby facilitating automatic communication management. Essentially, interruptability rules (and corresponding categories) can be associated to calendar entries and tasks thereby automating implementation of interruptability rules to manage communications received during calendar entries, tasks, meeting, appointments, etc.

16 Claims, 13 Drawing Sheets

(56) References Cited

U.S. PATENT DOCUMENTS

2010/0146499 A1\* 6/2010 Bush ................... G06F 21/604
                                                                717/178
2011/0030067 A1\* 2/2011 Wilson ........................ 726/27

\* cited by examiner

INTERRUPTIBILITY MANAGEMENT VIA SCHEDULING APPLICATION

BACKGROUND

Today, personal information management (PIM) applications are often used to organize e-mail, manage calendar entries, track tasks, manage contacts, provide note taking and enable journaling. These applications can be used as stand-alone applications or in conjunction with a server which provides enhanced functions for multiple users in an organization. For example, the server can provide multiple users ability to share mailboxes, calendars, folders and meeting time allocations.

Essentially, a PIM application refers to an information management tool or application that functions as a personal organizer. One main purpose of a PIM is to provide management (e.g., recording, tracking) of information such as calendar entries, contact information, e-mail or the like. When used in conjunction with a server, a PIM is capable of synchronizing data via a network (e.g., Internet, intranet) as well as rendering information to other users. For example, via the network, and so long as proper permissions are in place, a user can view calendar entries, e-mails, or other PIM data related to another user's account.

In these networked scenarios, a user can view another user's calendar to determine availability when scheduling a meeting or appointment. Where a user has a meeting or appointment on their calendar, they can designate the time slot as 'Free,' 'Tentative,' 'Busy,' or 'Out of Office.' This indication can be used by those viewing the calendar to make informed decisions with regard to scheduling a meeting that includes the owner of the calendar.

In some instances, PIM applications are customizable by a user. For example, rules can be set which can automate actions in specific scenarios. For instance, a user can define a rule that forwards all (or a subset) of received e-mails to another user or e-mail address. As well, a user can set an 'out-of-office' or OOF message that is displayed when a user is unavailable. Today, these OOF messages are set to provide canned responses to those who attempt to contact the unavailable user. By way of example, an OOF message may state "I am currently out of the office and have limited availability to e-mail—I will respond upon my return of September $15^{th}$. In the meantime, if you need to reach someone immediately, please contact my assistant Ava Mason." Unfortunately, this limited communication management must be manually toggled on and off by a user. In other words, a user must remember to turn off their 'OOF' message and corresponding management or all messages will continue to receive this OOF reply even though the user may be available.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system and methodology that facilitates management of user accessibility via a scheduling application. In operation, the innovation enables a user to link or map interruptibility levels to schedule entries, such as calendar entries or tasks. Essentially, the innovation enables interruptibility rules to be associated to calendar entries and tasks thereby automating implementation of interruptibility rules to manage communications received during calendar entries, tasks, meeting, appointments, etc.

Categories (or interruptibility rules) can be published along with an appointment or schedule entry such that user will be aware of a person's accessibility at any one time. Similarly, the publishing functionality can be used to impose an appropriate interruptibility rule upon participants or invitees of a meeting or appointment. In aspects, where authorization is granted, the participants or invitees can opt to accept or otherwise modify the interruptibility rule as desired.

In another aspect of the subject innovation the interruptibility rules can be manually generated as desired by a user or enterprise. Additionally, machine learning and/or reasoning mechanisms can be employed to provide a probabilistic and/or statistical-based analysis to prognose or infer an action that a user desires to be automatically performed with respect to the generation and/or applicability of interruptibility rules. The innovation disclosed herein contemplates a user interface that enables individuals to view, generate and/or modify interruptibility rules as desired.

In operation, these interruptibility rules can manage or route communication in accordance with time slots associated with schedule entries. Essentially, accessibility can be managed in accordance with a scheduling application. This management can automate toggling on/off communication routing rules (interruptibility rules) in accordance with the start and finish times set forth in a schedule entry. Additionally, logic can be provided that considers future scheduling entries in accordance with applicability of routing rules.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
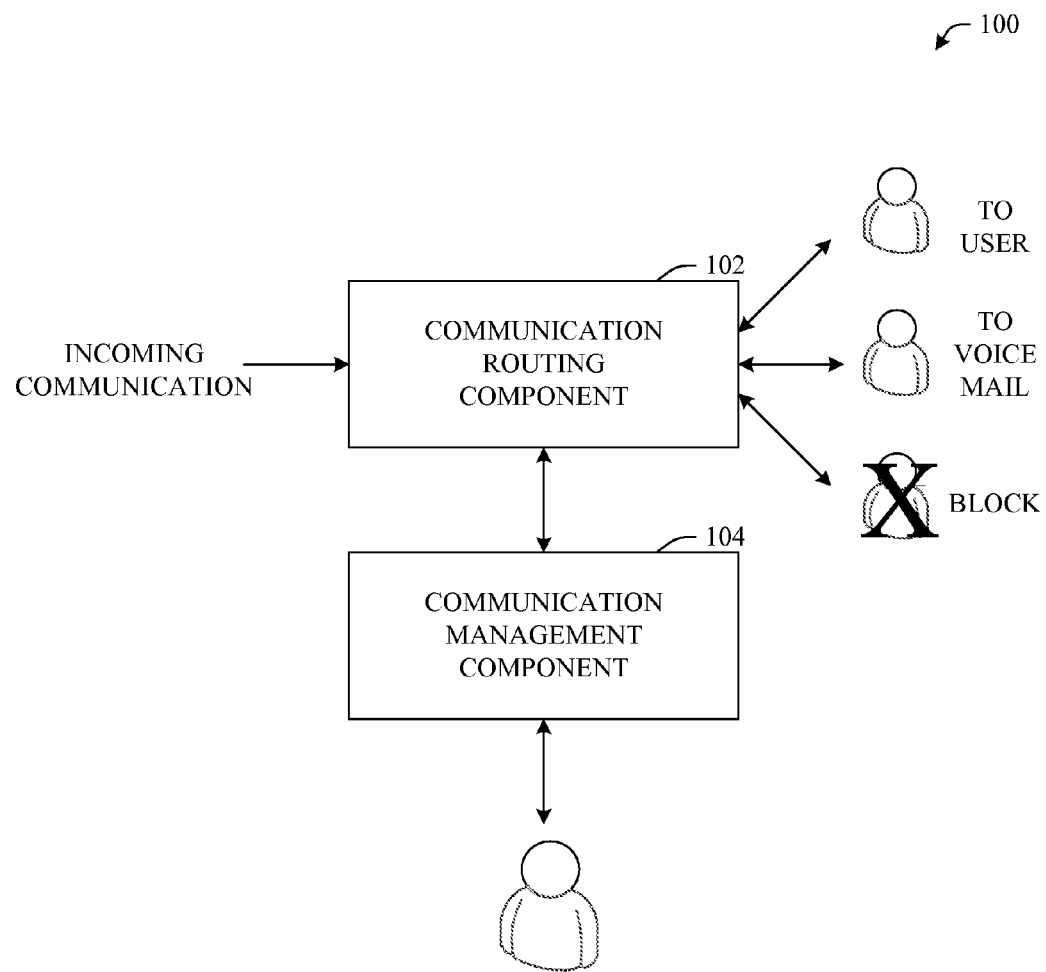
FIG. 1 illustrates a system that enables interruptibility levels to be associated with scheduling entries in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "rendering," "screen print," "snippet," and "user interface" are generally used interchangeably herein. The renderings are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring initially to the figures, FIG. 1 illustrates a system 100 that is capable of providing a comprehensive and sophisticated scheduling experience for users with regard to interruptibility in entries, such as calendar entries. Generally, system 100 can include a communication routing component 102 and a communication management component 104 which together can manage both user-defined or system-inferred interruptibility levels with regard to a user scheduled activity or calendar. Essentially, system 100 can control when people want interrupted, when they don't want interrupted, who can and interrupt them, and who is not permitted to interrupt them. In other words, the innovation can control this accessibility by enabling interruptibility levels to be linked to schedule entries. These aspects can be controlled by interruptibility rules that are either predefined based upon what a user wants, inferred on behalf of a user or set by a third party to control accessibility of the user.

The communication management component 104 enables users, e.g., information workers, to employ scheduling applications to manage their time with regard to interruptibility levels. For instance, schedule entries can be employed to toggle accessibility on/off based upon policy, preference, context, etc. In other words, a user or information worker can block out time such that incoming communications can be blocked or handled in accordance with a policy or preference. While many of the examples described herein are directed to incoming voice communications such as voice-over-Internet Protocol (VoIP), is to be appreciated that other types of incoming communication including, but not limited to, electronic mail (aka e-mail), instant messaging (IM), text messaging (SMS), or the like can be managed in alternative examples without departing from the spirit and scope of the innovation defined herein. Accordingly, these alternative examples are to be included within the scope of this disclosure and claims appended hereto.

Referring again to FIG. 1, the communication management component 104 can enable users to define interruptibility rules which can be carried out by the communication routing component 102. For instance, the communication routing component 102, based upon a calendar entry and corresponding interruptibility level, can direct communications in accordance to a predefined rule. In one example, the communication can be routed to a user, to a user's voicemail, to an alternative target, or blocked entirely as desired.

In addition to routing communication, communication routing component 102 can also prompt callers to provide additional information such as urgency of the call, name of the caller, reason for the call, or the like. Based upon this information, the communication management component 104 can determine an appropriate interruptibility rule which defines how to instruct the communication routing component 102 to handle the communication. Effectively, the system 100 enables users to manage interruptibility levels by way of a scheduling application.

Conventionally, users had to manually manage availability state. In other words, users were forced to set and initialize individual rules in order to forward communication at any given time. Unfortunately, in the past, these interruptibility rules were not interfaced to time slots within the scheduling application. As will be understood, one drawback of these conventional systems was that users were forced to remember when to turn the system on and when to turn the system off in order to correctly manage communications. Unlike conventional systems, the current innovation enables users to set specific interruptibility rules through a scheduling application or more particularly through calendar appointments and entries within the scheduling application.

In one aspect, a user is able to associate interruptibility levels to 'categories' and thereafter apply the categories to specific calendar entries. In accordance therewith, incoming communication would be handled in accordance with the category-associated interruptibility rule. Additionally, the subject innovation enables interruptibility categories to the reused and applied to other calendar entries. In aspects, most any naming convention can be used to define categories, for example, 'category A,' 'vacation,' 'busy-DND (do not disturb),' 'out-of-office (OOF),' 'with family,' 'personal,' 'interview,' or the like. Each of these categories can be associated with different interruptibility rules which can manage incoming communications during the designated time period.

Figure 2:
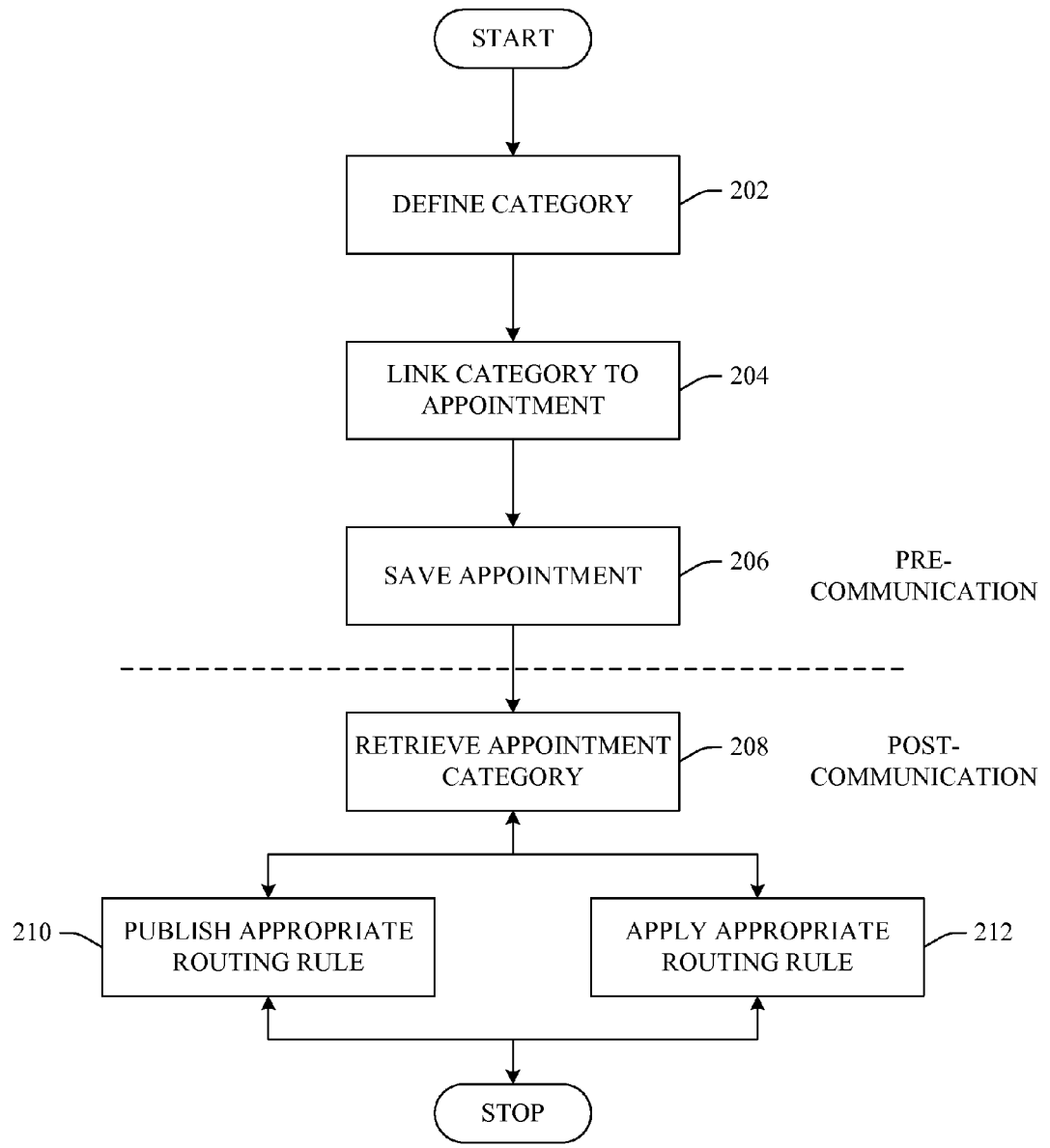
FIG. 2 illustrates an example flow chart of procedures that facilitate linking categories to appointments to manage availability in accordance with an aspect of the innovation.

FIG. 2 illustrates an example methodology of using categories to control interruptibility within a scheduling application. While this methodology employs categories to associate interruptibility levels or rules to a schedule entry, it is to be understood that these interruptibility rules can be applied directly to an entry in other aspects. These additional aspects will be described in connection with the figures that follow infra.

While, for purposes of simplicity of explanation, the one or more methodologies shown herein, e.g., in the form of a flow chart (or process flow), are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, a category can be defined, for example, an interruptibility rule that corresponds to a designated category can be defined. In aspects a category can correspond to a given project or activity. Additionally, an interruptibility level or policy can be applied to the category as desired. Although a single category is illustrated as being defined in 202, it is to be appreciated that multiple categories can be defined without departing from the spirit and scope of the innovation described herein.

At 204, the category can be associated to an appointment or calendar entry. As will be described infra, this association at 204 can be effected manually or alternatively, automatically in alternative aspects. For instance, a user can affirmatively associate a category to appointment while in other aspects, the association can be based upon content or context or can be automatically inferred and thereafter automatically associated to an appointment.

The appointment can be saved within the scheduling application at 206. It is to be understood that saving the appointment can enable the category and corresponding appointment to be published to selected users. In a particular example, authorized individuals such as an administrative assistant or a colleague can view the category and corresponding interruptibility level assigned to an appointment or entry. Additionally, a particular category can be made available for use with future appointments that correspond to the same (or similar) activity or project.

The dashed line in FIG. 2 denotes a separation between pre-communication methodology and post communication methodology in accordance with aspects of the innovation. As shown pre-communication actions occur at 202, 204 and 206 respectively. Accordingly, post-communications occur at 208, 210 and 212 respectively. While FIG. 2 illustrates this separation in accordance with one example embodiment, it is to be understood that all, or a subset, of the actions can occur pre or post-communication without departing from the spirit and scope of the innovation.

Continuing with the example methodology of FIG. 2, once a communication is received, the appointment category is retrieved (or otherwise evaluated) at 208. In other words, upon receiving a communication during the period of an appointment, the methodology automatically retrieves (or evaluates) the respective interruptibility category that corresponds to a particular schedule entry or moment in time. In one aspect, at 210, the appropriate routing rule can be published to the caller of incoming communication or to the initiator of the incoming communication if not a voice call.

It is to be understood that, in other aspects, the category or interruptibility rule can be published to the participants of a particular meeting or scheduled entry. Thus, participants can be made aware of the corresponding interruptibility and, if desired and/or authorized, the participants can modify (or request modification of) the interruptibility level. Once an appointment or schedule entry is accepted by a participant or attendee, the category and corresponding interruptibility level will be imposed upon communications received during the allotted time period. Finally, at 212 the appropriate routing rule can be implemented or applied to incoming communications for all participants (or attendees) related to a schedule entry.

Figure 3:
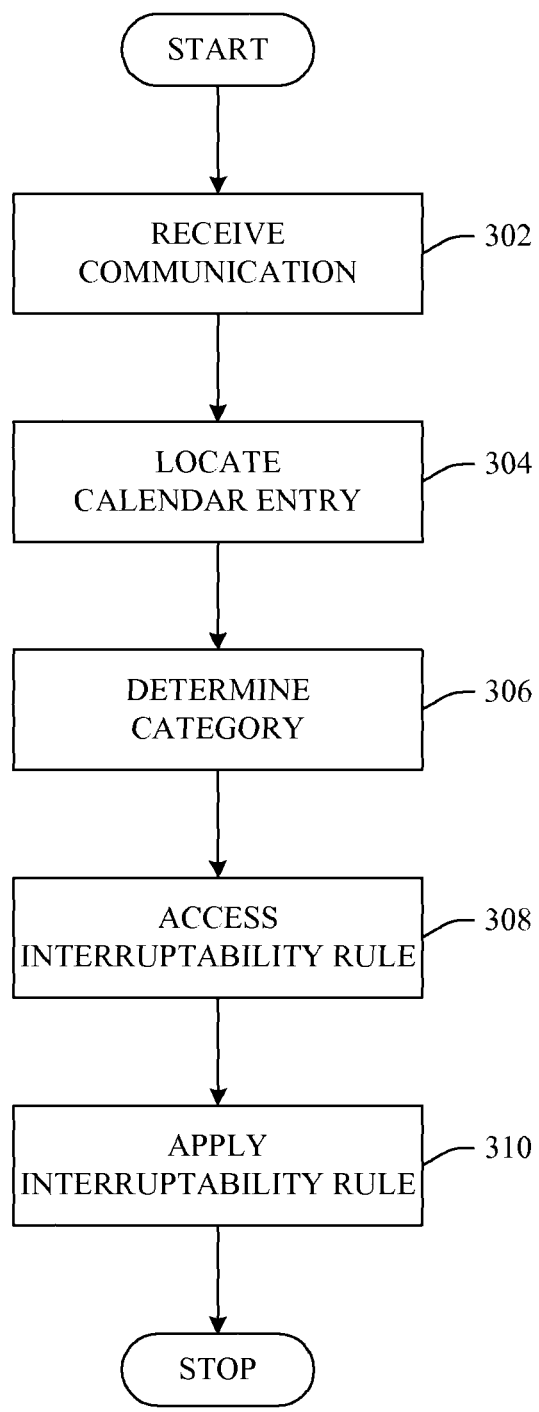
FIG. 3 illustrates an example flow chart of procedures that facilitate managing availability in accordance with an aspect of the innovation.

Referring now to FIG. 3, illustrated is an example methodology of processing incoming communication in accordance with the programmable interruptibility functionality of the subject innovation. At 302, a communication can be received by a user. As described supra, this incoming communication can be a voice communication, e-mail, text message (SMS), IM, or the like. Accordingly, it is to be appreciated that the functionality of the innovation can be applied in conjunction with most any type of communication known in the art. More particularly, the interruptibility levels associated with calendar or scheduling applications can be used to automatically route most any type of digital communication related to a calendar or schedule entry without the departing from the spirit and scope of the subject innovation.

At 304 a calendar entry can be located. For example, the time of the incoming communication can be compared against a user schedule or calendar in order to determine the applicable calendar entry. As was described above, this applicable calendar entry can be linked to an interruptibility level which sets forth policies or preferences by which to handle incoming communications. It is to be understood that these policies and preferences can be based on most any factor including, but not limited to, 'identity' of sender, 'identity' of recipient, urgency of communication, content of communication, as well as other contextual factors. In other words, an interruptibility rule can be as simple as a direction to forward all communication to voice-mail any given time. Alternatively, the rule can be as complex as filtering particular communication based upon contextual factors, 'identities' of parties or the like in order to determine an appropriate routing protocol.

It is to be understood that 'identity' can refer to most any identity including, but not limited to, digital identity, role-based identity, activity-based identity, or the like. Accordingly, an interruptibility rule can be applied as a function of most any of these factors or combination thereof. As an example, if a user is at the office and in a meeting, it is possible to associate an interruptibility rule to that meeting such that all communication is blocked or redirected with defined exceptions. For instance, communication from a family member or of urgent priority can be permitted while other communications will be blocked or redirected. It will be understood that the scope of interruptibility rules is endless—this example is included merely to provide perspective to the innovation. As such, other conceivable examples of rule parameters are to be included within the scope of this disclosure.

In one example, and as shown at 306, a category can be located as associated with a particular calendar entry. In this example, the category can be defined and associated to interruptibility rules related to any given time slot or calendar entry. These preferences and/or policies can be directed by user, by an association, by an enterprise, or most any other entity as appropriate. Additionally, interruptibility rules (and scope thereof) can be inferred or determined based upon factors related to the calendar entry, e.g., participants, content, subject, context, etc. As will be shown and described with reference to the figures that follow, interruptibility levels can be associated directly (e.g., without the use of categories) to calendar entries in order to manage a user's accessibility in any given time period.

It is contemplated that users employ their calendar to schedule various parts of their daily activities. In each of these daily activities, users can be in various states of quote "busy-ness." For example, when someone is in an interview, they may not want to be disturbed by voice, IM, e-mail, or SMS communications. When someone is playing soccer, their calendar might indicate "out of the office" state such that their calls are to be diverted to their colleague or to their cellular phone. These are just two examples of how the defined interruptibility functionality of the subject innovation can be employed in connection with scheduling applications.

The innovation described herein enables users to block chunks of time in their calendar when it is desired to not receive incoming communication, such as phone calls, e-mail, IM, text messages, etc. Additionally, the innovation enables users to specify who can contact them, under what circumstances they can be contacted, which modalities are permitted or not permitted, as well as most any other interruptibility rule desired. Essentially, the innovation can associate categories added to a calendar item with an interruptibility level(s) associated with the category.

Additionally, as stated above, the innovation allows meeting participants (attendees) or organizers to directly specify the interruptibility levels in the calendar item or entry. It will be appreciated that using categories for frequently used activities allows a user to solve major pain points with marking time off a calendar and setting the interruptibility levels at the same time. In other words, efficiency in handling incoming communications with respect to calendar entries can be easily programmed by a user or meeting organizer.

Still further, the innovation allows users to reuse commonly used categories. In one example, a scheduling application can gather information and 'learn' from associations. This information can be used to suggest or automatically assign a category to a calendar entry based upon most any factor, including but not limited to, subject, time of day, location, participants, etc.

In one example, a category such as 'interview' can be associated with a "do not disturb (DND)" interruptibility state. In another example, a 'playing golf' category can be associated with a 'forward' interruptibility state which redirects calls to specific persons, devices or telephone numbers, such as a mobile phone. In yet another example, a category such as 'working at home' can be associated with an interruptibility level that redirects voice communications from an office phone to a user's home phone (or mobile phone). Essentially, based upon the current time, the innovation can retrieve the interruptibility state related to that particular hour or period of time (e.g., calendar entry) and can handle the incoming communication appropriately. Additionally, the innovation can also display the current forwarding state and reasons why a particular forwarding state has been selected by the user.

With reference again to the example of FIG. 3, at 308 an interruptibility rule that corresponds to the category from 306 can be accessed. As described above this interruptibility level can provide rules and information with regard to handling incoming communication based upon most any factors including identity of parties, type of communication, context of communication, or the like. Accordingly, at 310, the interruptibility rule can be applied to the communication to handle or route as desired.

Figure 4:
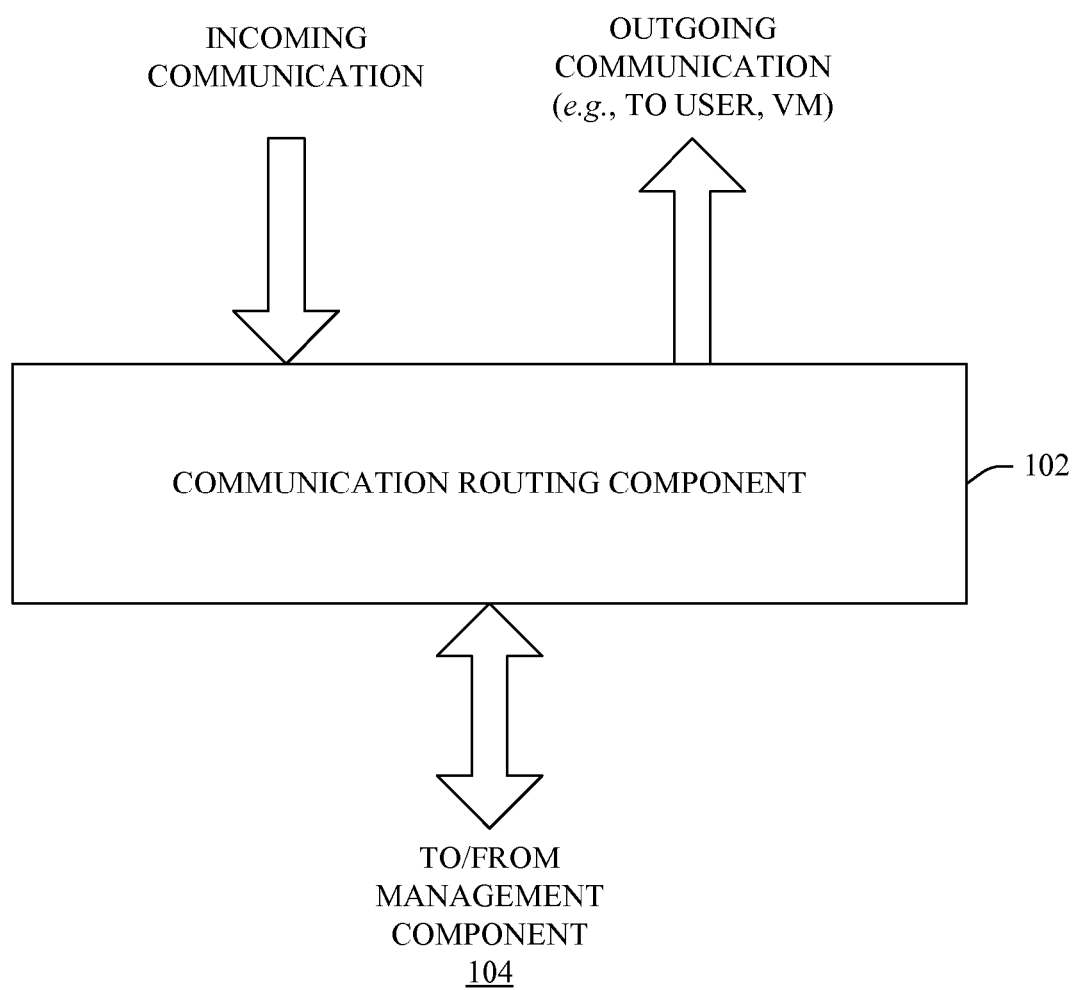
FIG. 4 illustrates a block diagram of a communication routing component that directs communication in accordance with an aspect of the innovation.

Turning now of FIG. 4, a block diagram of a communication routing component 102 is shown in accordance with an aspect of the innovation. As illustrated communication routing component 102 can receive incoming communication and process an outgoing action or outgoing communication in accordance with an appropriate interruptibility rule. As described above, the interruptibility rule can dictate how a communication is handled during a particular calendar entry or group of entries.

As shown, the communication routing component 102 can communicate to the management component 104 in order to obtain instruction related to handling incoming communication. Effectively, the communication routing component 102 can receive incoming communication and coordinate with the management component 104 with regard to an appropriate interruptibility level associated with a moment in time. In other words, as will be described in greater detail with reference to FIG. 5, the management component 104 can provide the communication routing component 102 with instruction as to how to handle or route incoming communications during a particular time period, or calendar entry.

Figure 5:
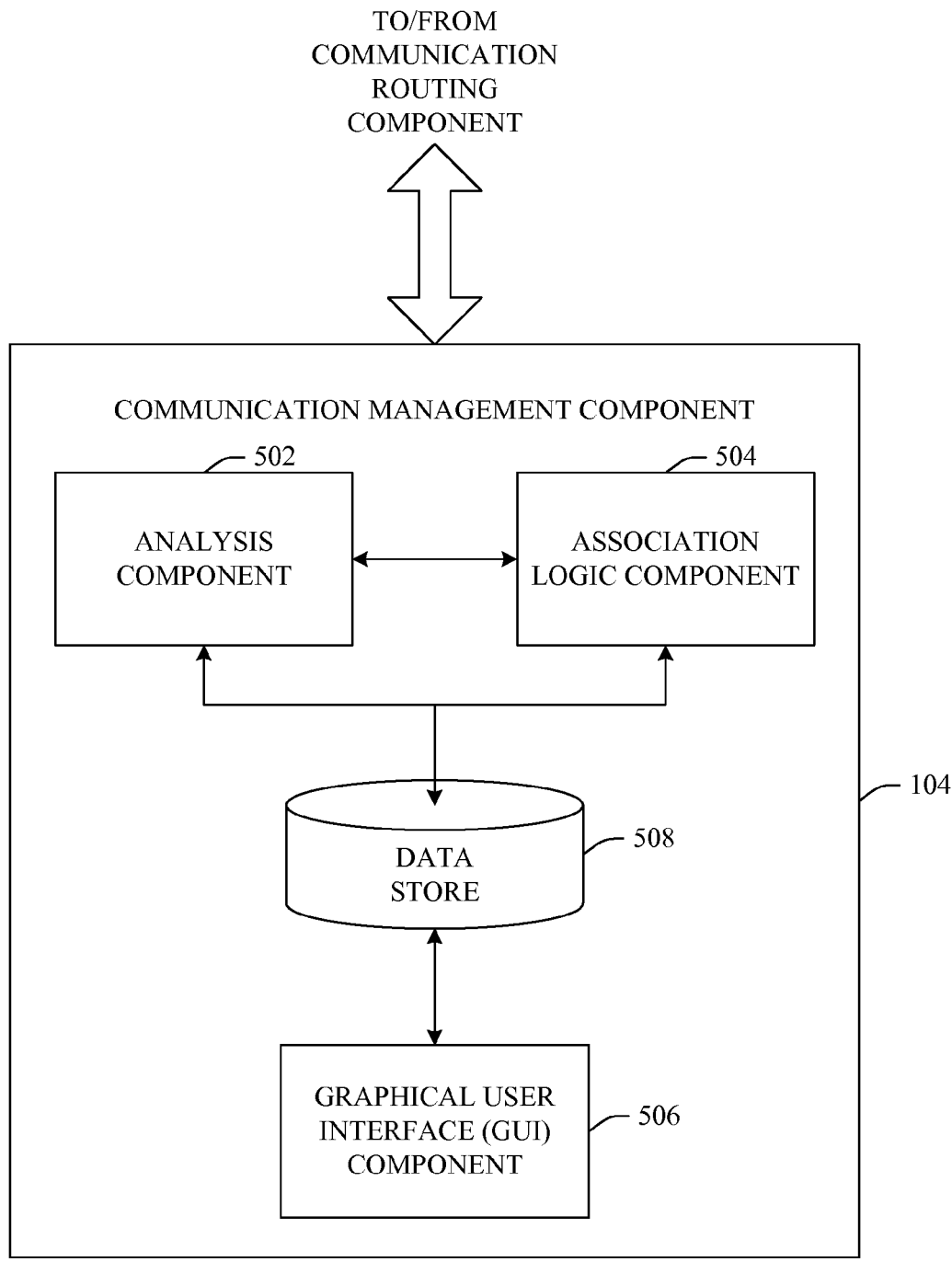
FIG. 5 illustrates a block diagram of a management component that manages incoming communications in accordance with an interruptibility rule associated to a schedule entry in accordance with an aspect of the innovation.

Referring now to FIG. 5, an example block diagram of a communication management component 104 each shown in accordance with an aspect of the innovation. Generally, communication management component 104 can include an analysis component 502, an association logic component 504 and graphical user interface (GUI) component 506. Together these components 502, 504, 506 can enable association of interruptibility rules with regard to a time entry or other calendar entry. It is to be appreciated while many of the aspects described herein are directed to calendar entries within a scheduling or communication application, other aspects can be applied to specific user activities such as tasks, projects, most any other scheduled activity. These alternative aspects are to be considered a part of the subject innovation and claims appended hereto.

Upon receiving a communication, the analysis component 102 can analyze the moment in time to determine an applicable interruptibility level or category that corresponds to the incoming communication in view of a user's calendar. Association logic component 504 can be employed together with the analysis component 502 in order to provide sophisticated logic in determining an applicable category or interruptibility level. In operation, the analysis component 502 can analyze a current calendar entry to determine an appropriate category classification.

In other aspects, the analysis component 502 together with the association logic component 504 can consider future calendar entries when determining how best to handle an incoming communication. For example, if a call is received at 9:57 a.m. and a calendar entry is set for 10:00 a.m. with a category associated with 'do not disturb,' the association logic component 504 can instruct the communication routing component 102 to apply the 'do not disturb' interruptibility rule. A threshold can be set by a user (or alternatively inferred) which can be employed to determine when to apply future calendar entries and corresponding interruptibility ratings. In other words, the system logic can make intelligent decisions based upon a schedule as a whole rather than merely considering a single instant entry.

In operation, an initiator of an appointment or calendar entry can select or define an interruptibility rule. This rule can be published to selected participants or attendees such that the category or interruptibility level can be known to participants to an appointment, meeting, etc. As will be appreciated, this functionality enables the initiator of appointment to control interruptions of all participants during a particular appointment. However, in aspects, participants can be provided authorization to delete or modify an interruptibility rule as appropriate or desired.

Figure 6:
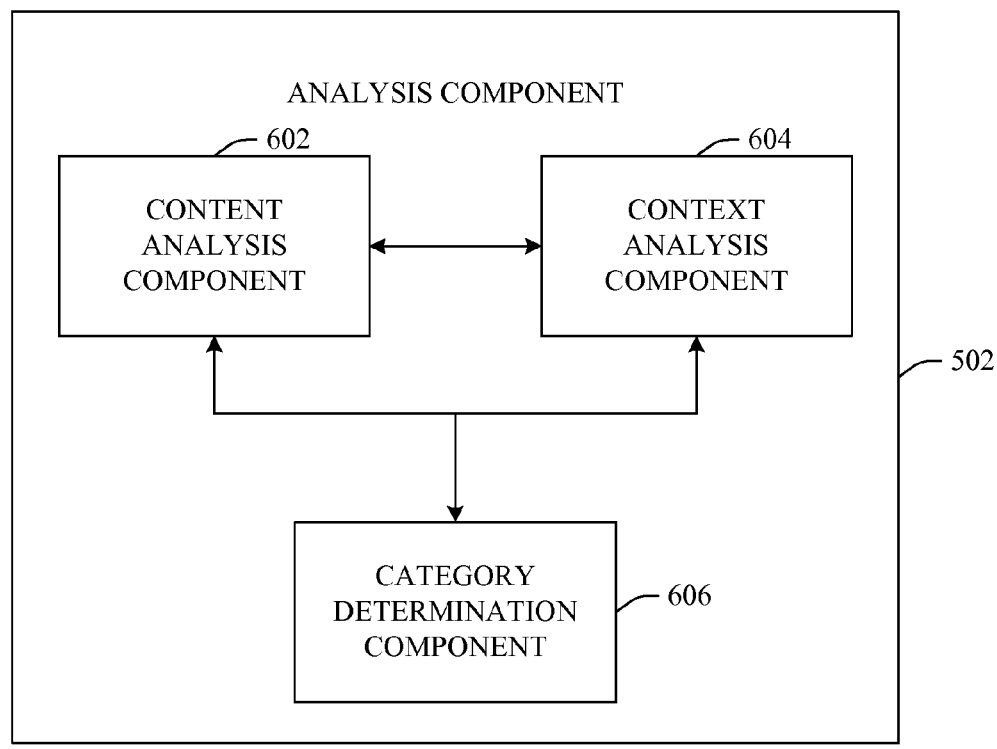
FIG. 6 illustrates a block diagram of an analysis component that is capable of analyzing communications in order to apply interruptibility rules in accordance with aspects of the innovation.

With reference now to FIG. 6, an example block diagram of an analysis component 502 is shown in accordance with an aspect of the innovation. As illustrated, the analysis component 502 can include a content analysis component 602, a context analysis component 604, and a category determination component 606. The functionality of each of these components will be described in greater detail below.

The content analysis component 602 can automatically analyze or evaluate an incoming communication so as to determine specific characteristics associated to the communication. For example, the content analysis component 602 can perform text analytics upon the content of the communication in order to determine the subject of the communication, identities of parties, etc. related to the communication. In one aspect, this textual analysis is particular useful for the communication such as e-mail, IM, text messages or the like. Essentially, the content analysis component 602 can compile a list the relevant factors or example keywords associated with an incoming communication. These relevant factors can be used by the decision logic in determining how to handle the communication in accordance with an interruptibility rule. In other words, where interruptibility rules use specific characteristics to manage communications, these factors can be used to apply an applicable rule.

The context analysis component 604 can be employed to incorporate contextual awareness into implementation of an appropriate interruptibility rule(s). For instance, the context analysis component 604 can be employed to determine factors such as location, date, time of day, identity, engaged activity, or the like. The information gathered and compiled by the content and/or context components (602, 604) can be used when applying appropriate interruptibility rules to handling communication.

The category determination component 606 can be used to determine an appropriate category and/or interruptibility rule in accordance with a moment in time or a calendar entry. This category determination component 606 can employ mappings between a calendar entry and a particular category or interruptibility level in order to determine communication handling protocols.

In operation, the determined category and/or interruptibility rules can be applied against information gathered by the content analysis component 602 and the context analysis component 604 in order to efficiently route or handle communications received during defined time periods. As described above, this functionality enables interruptibility rules to be linked directly to calendar entries within a scheduling application. It will be appreciated that this integrated interruptibility functionality can provide users with a comprehensive and sophisticated scheduling application.

Figure 7:
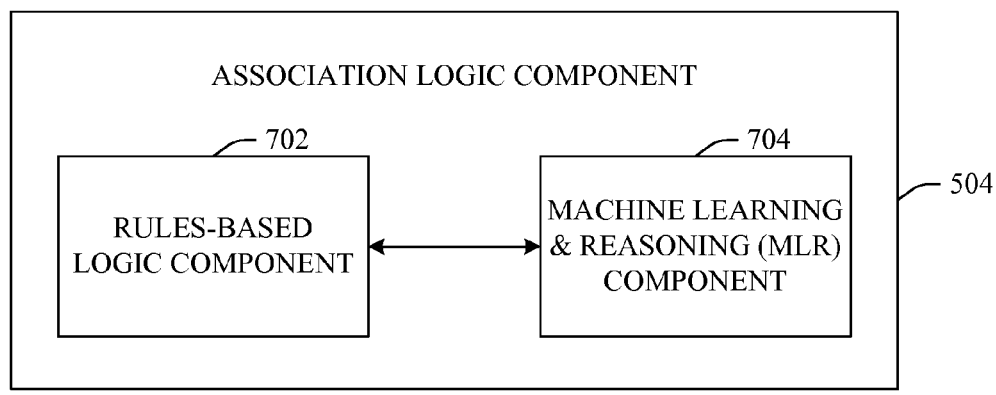
FIG. 7 illustrates an association logic component that evaluates communication analysis in view of interruptibility rules in accordance with aspects of the innovation.

With reference now to FIG. 7, an alternate block diagram of an association logic component 504 is shown. Generally, association logic component 504 can include a rules-based logic component 702 and/or a machine learning & reasoning (MLR) component 704. Essentially, these two components enable logic to be preprogrammed by or inferred on behalf of a user. Examples of each of these logic mechanisms are described below. While specific examples are set forth infra, it is to be understood that most any criteria can be used to automate functionality in accordance with aspects of the innovation.

Rules-based logic component 702 can employ implementation schemes (e.g., rules) to define and/or implement logic in establishing interruptibility levels. It will be appreciated that the rule-based implementation can automatically and/or dynamically define and implement an appropriate interruptibility rule. Thus, the rule-based implementation can be used to provide instruction with regard to communication handling in accordance with most any criteria (e.g., communication type, identity, context, content, etc.).

By way of example, a user can establish a rule that can define who can call during a particular time period, what types of communications are permitted, urgency levels allowed, content that is to be passed through, etc. Similarly, the rule can identify which communications are to be re-routed or blocked in accordance with the rule. Once a rule has been established (e.g., via GUI 508 of FIG. 5), the rule can be associated to a category or directly to a calendar entry or other schedule entry as discussed supra.

FIG. 7 also illustrates that association logic component 502 can employ a machine learning & reasoning (MLR) component 704 which facilitates automating one or more features in accordance with the subject innovation. The subject innovation (e.g., in connection with rule generation or selection) can employ various MLR-based schemes for carrying out various aspects thereof. For example, a process for determining factors used to manage incoming communications can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to predetermined criteria how best to construct an interruptibility rule, what criteria to consider with reference to an interruptibility rule, when to associate an interruptibility rule to a schedule entry, etc.

Figure 8:
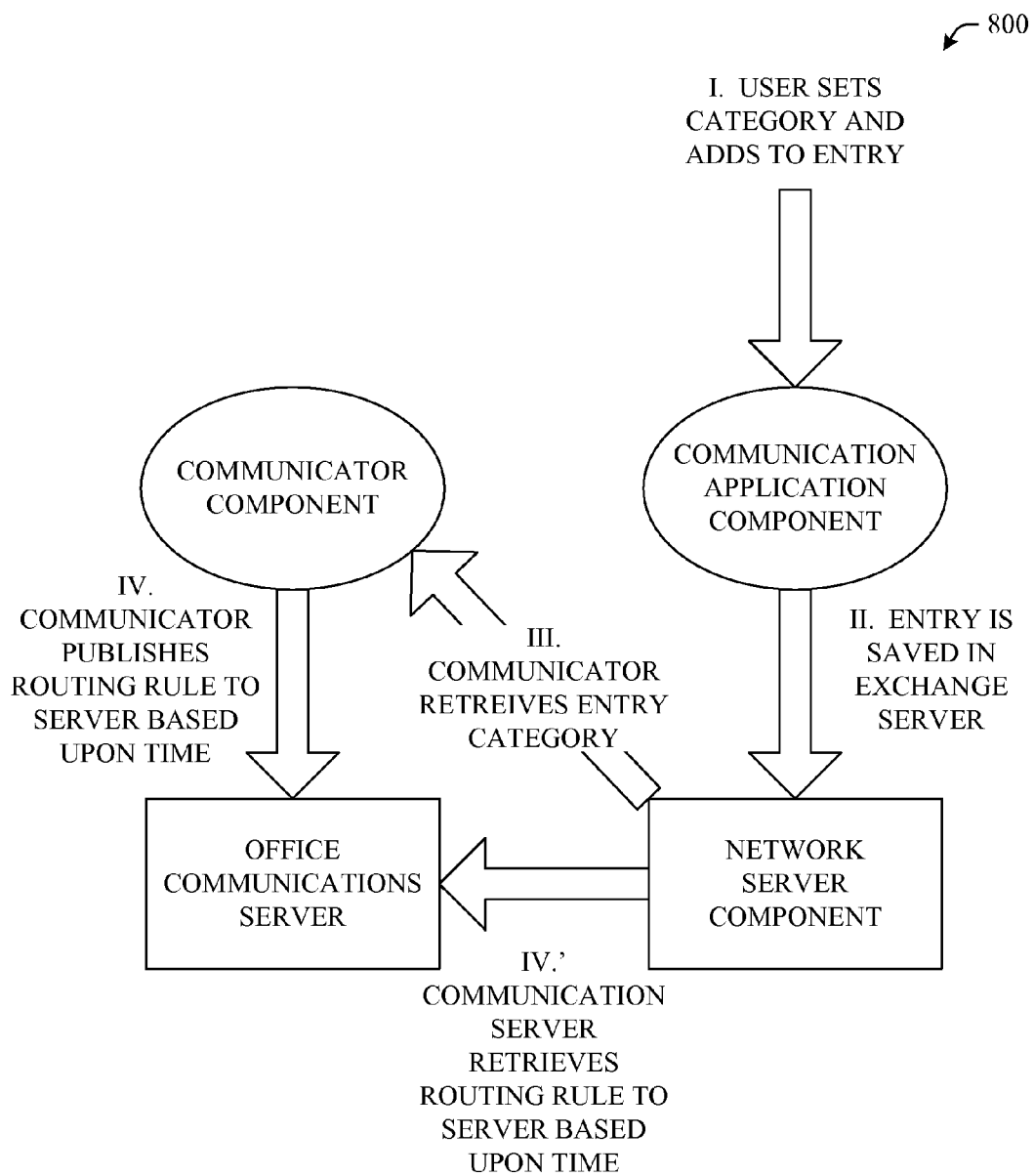
FIG. 8 illustrates an example process flow of employing interruptibility rules and categories to manage accessibility during calendar appointments in accordance with aspects of the innovation.

Turning now to FIG. 8, a process flow 800 in accordance with an aspect of the innovation is shown. More particularly, FIG. 8 illustrates an example process flow 800 between a communication application component (e.g., e-mail or scheduling application), a network server component (e.g., Exchange server), a communicator component (e.g., interruptibility management component) and an office communications server component. While each of these components are illustrated as separate, stand-alone components, it is to be understood that all, or a portion, of the functionality of these components can be incorporated into combined components without departing from the scope of the innovation.

The example process flow 800 of FIG. 8 is segregated into four actions, where the fourth action (e.g., IV) is illustrated as an alternate process action. Beginning at action I, a user can set a category and accordingly link the category to an entry. As described in greater detail supra, here, the user can link a category to a particular schedule entry such as a calendar entry, meeting, appointment, task, etc. As illustrated, the communication application component can maintain this mapping or association.

Next, at action II, the entry is saved into a network server component such as an Exchange-brand server component. For example, a user can employ a local or client-based communication application component to set (or define) a category (and corresponding interruptibility rule). Thereafter, the information can be saved or synchronized into a network server component such as an Exchange-brand server.

At action III, the communicator component can retrieve the current entry and category from the network server. Thus, at action IV, the corresponding routing rule can be published to the office communications server based upon a current time. Alternatively, at action VI', the office communications server can retrieve the routing rule from the exchange server based upon the time.

Essentially, the illustration of FIG. 8 depicts some of the actions of the systems and methods described in greater detail above. While detailed descriptions of components and subcomponents were described above, FIG. 8 illustrates a higher level perspective view of a walkthrough in accordance with an aspect of the innovation. This walkthrough is not intended to limit the scope of the innovation in any way. Rather, the walkthrough is provided merely to add perspective to the innovation and functionality of the components (and methodologies) described supra.

Figure 9:
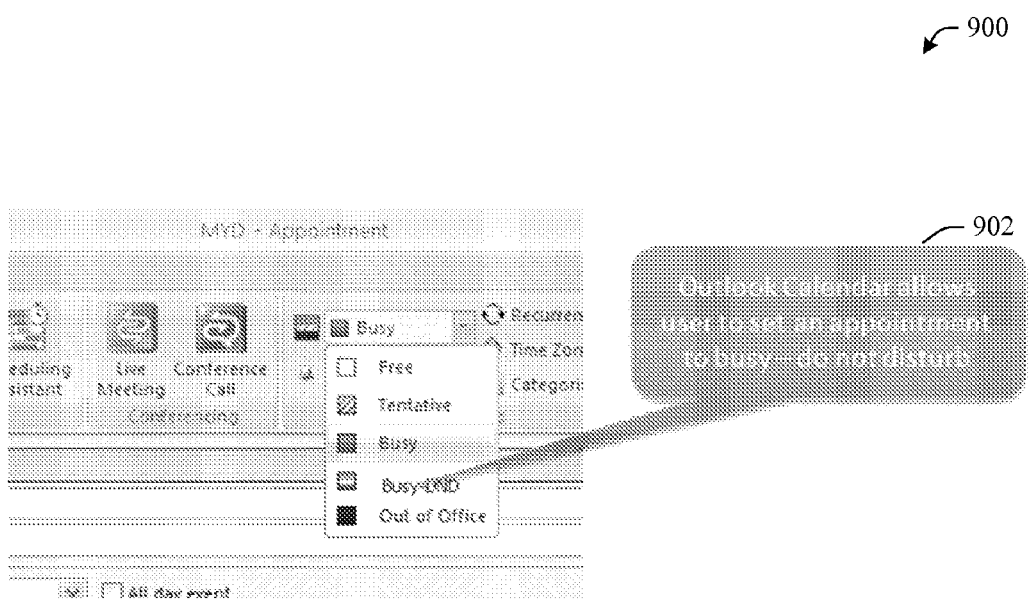
FIG. 9 illustrates an example user interface (UI) rendering that depicts applying interruptibility levels to calendar entries in accordance with an aspect of the innovation.
Figure 10:
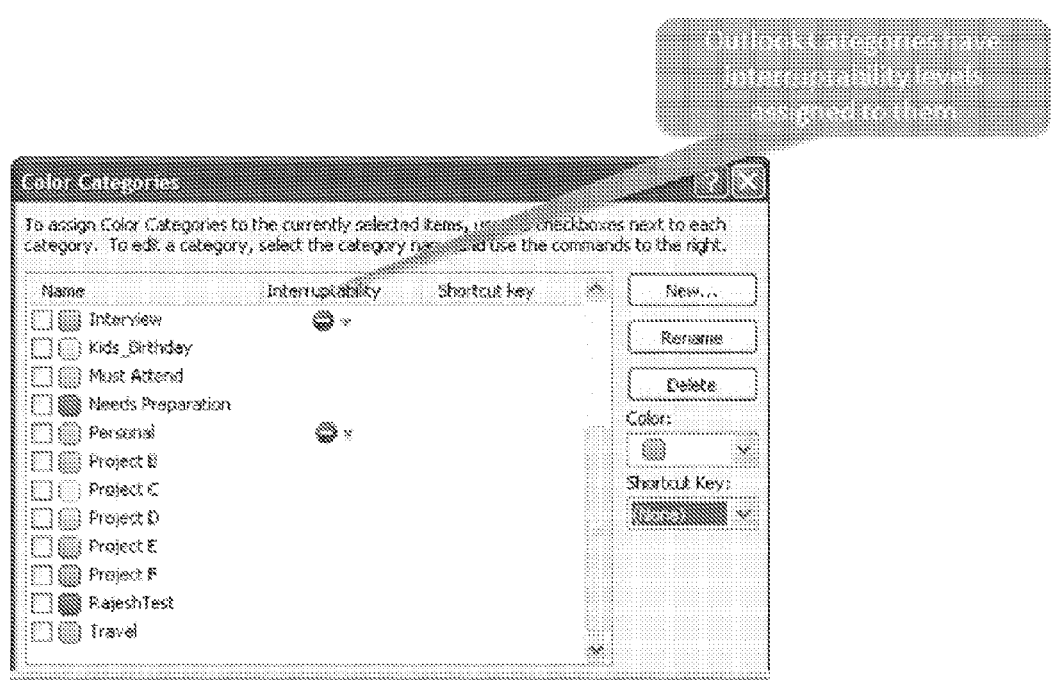
FIG. 10 illustrates an example UI rendering that depicts the use of categories associated with interruptibility levels in accordance with aspects of the innovation.
Figure 11:
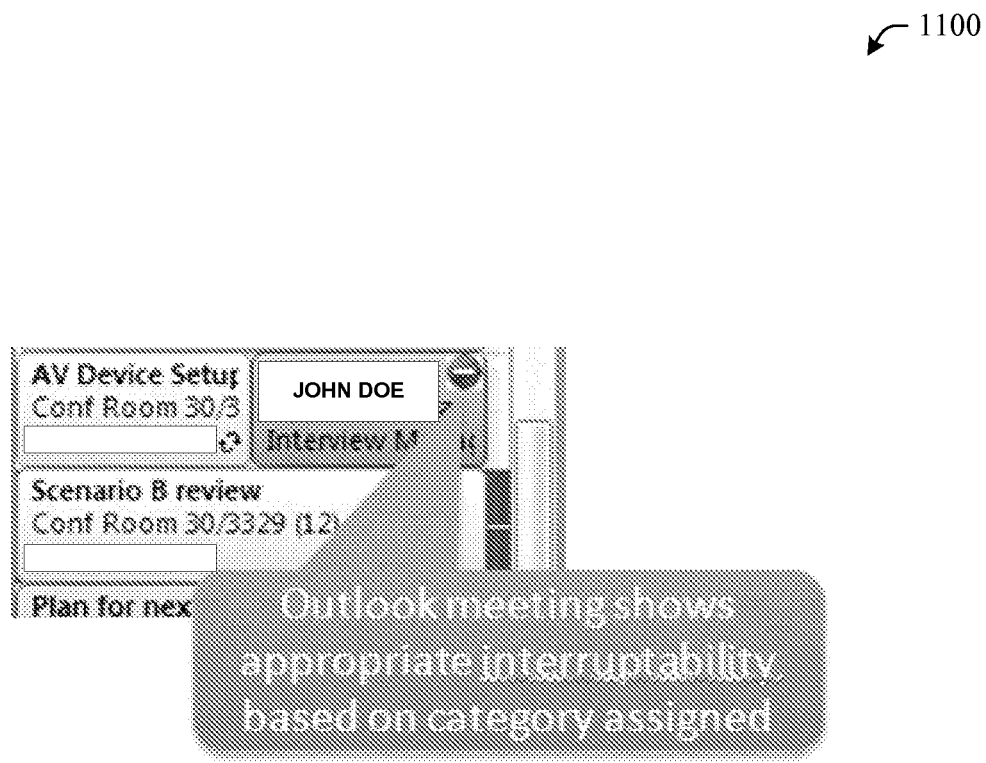
FIG. 11 illustrates an example UI rendering that illustrates iconic representations that define interruptibility levels within a calendar view in accordance with aspects of the innovation.

FIGS. 9, 10 and 11 illustrate example screen shots of an example GUI (e.g., 508 of FIG. 5) in accordance with aspects of the innovation. It is to be understood that other renderings can be provided that enable the same or similar functionality as that shown in FIGS. 9, 10 and 11. Accordingly, it is to be understood and appreciated that these conceivable renderings are to be included within the scope of this disclosure and claims appended hereto.

Turning first to FIG. 9, an example user interface (UI) rendering 900 is shown in accordance with an aspect of the innovation. Generally, FIG. 9 illustrates an example of associating interruptibility levels with calendar items (e.g., without the use of 'categories' as described above). FIG. 10 that follows addresses the ability to associate categories with interruptibility rules and levels.

As shown in FIG. 9, a drop down menu 902 is shown that makes available numerous interruptibility categories to a user. More particularly, FIG. 9 illustrates an example image snippet from an e-mail/scheduling application. This image illustrates how an interruptibility state can be added to a calendar entry. In this example, a 'Busy-DND' or 'Busy-Do-Not-Disturb' level is chosen. As described above, specific interruptibility rules can be defined (or inferred) that correspond to this level. In operation, communications received during the time period designated for the entry will be handled in accordance with the 'Busy-DND' level and corresponding rules. As described above, these rules can be as simple as 'block all communications received during the entry' to 'block only communications from the following specified individuals . . . ' Most any criteria can be used in defining appropriate interruptibility rules—whereas these rules can be mapped and associated to a specific calendar entry. This affords a user ease of automatically toggling and controlling the communication management functionality in accordance with scheduling applications. While the aforementioned example includes the 'Busy-DND' level, it is to be understood that alternative examples can include other levels including, but not limited to, 'Busy-On Phone,' 'Busy-Conference Call,' etc. These and other variations are to be included within the scope of this specification and claims appended hereto.

In addition to the canned drop down menu 902 of FIG. 9, it is to be understood that the innovation provides users with an ability to customize and/or modify the drop down menu 902 in order to conform to a specific policy and/or preference. Similarly, third parties (e.g., employers, developers) can preload or customize available levels as preferred or desired.

FIG. 10 illustrates another example UI rendering 1000 in accordance with an aspect of the innovation. Specifically, FIG. 10 illustrates the use of categories with respect to identifying corresponding interruptibility levels. Here, each category can have an interruptibility level assigned specific to the category. In operation, this interruptibility level can be imported and imposed on other users, participants or attendees to a meeting which is tagged with the particular category designation.

FIG. 10 shows an image snippet 1000 or screen shot which depicts an advanced categories setting dialog in accordance with an aspect of the innovation. As such, this screen print of the example UI illustrates how interruptibility levels can be set using categories.

FIG. 1 illustrates an example rendering 1100 of how the interruptibility levels are shown in a calendar view. More particularly, the calendar displays the interruptibility levels inline within the calendar view based upon the category assigned. As shown, this interruptibility level can be displayed as a small iconic representation within the particular calendar entry. Additionally, as described above, this representation can be rendered to others who view a user's calendar as well as to those who are attendees or participants to a particular meeting.

Figure 12:
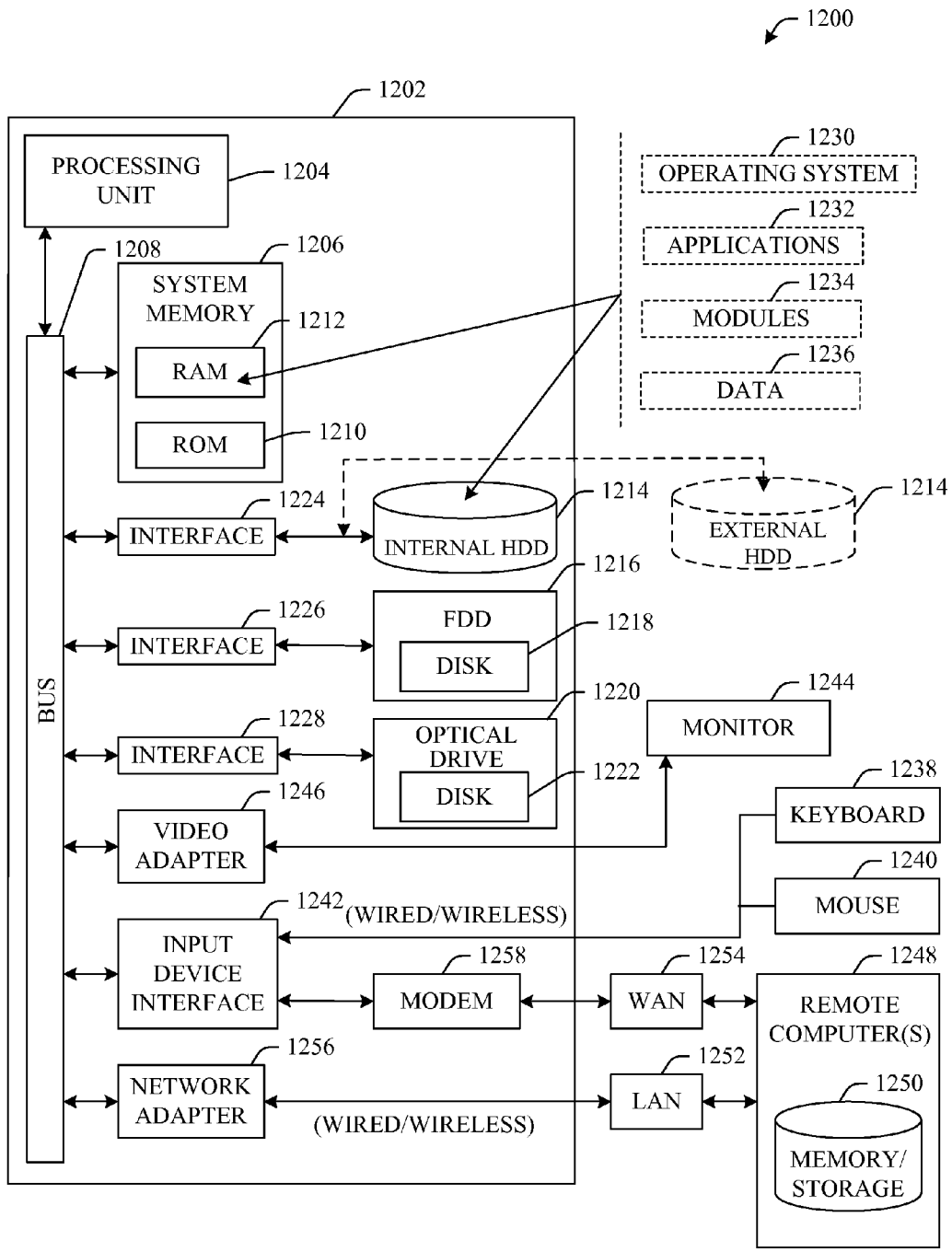
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the subject innovation, FIG. 12 and the following discussion are intended to provide a brief, general description of a suitable computing environment 1200 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the innovation includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the innovation can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1130 is illustrated. The logical connections depicted include wired/wireless connectivity to a local area network (LAN) 1132 and/or larger networks, e.g., a wide area network (WAN) 1134. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1132 through a wired and/or wireless communication network interface or adapter 1136. The adapter 1136 may facilitate wired or wireless communication to the LAN 1132, which may also include a wireless access point disposed thereon for communicating with the wireless adapter 1136.

When used in a WAN networking environment, the computer 1202 can include a modem 1138, or is connected to a communications server on the WAN 1134, or has other means for establishing communications over the WAN 1134, such as by way of the Internet. The modem 1138, which can be internal or external and a wired or wireless device, is connected to the system bus 1208 via the serial port interface 1242. In a networked environment, program modules depicted relative to the computer 1202, or portions thereof, can be stored in the remote memory/storage device 1130. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
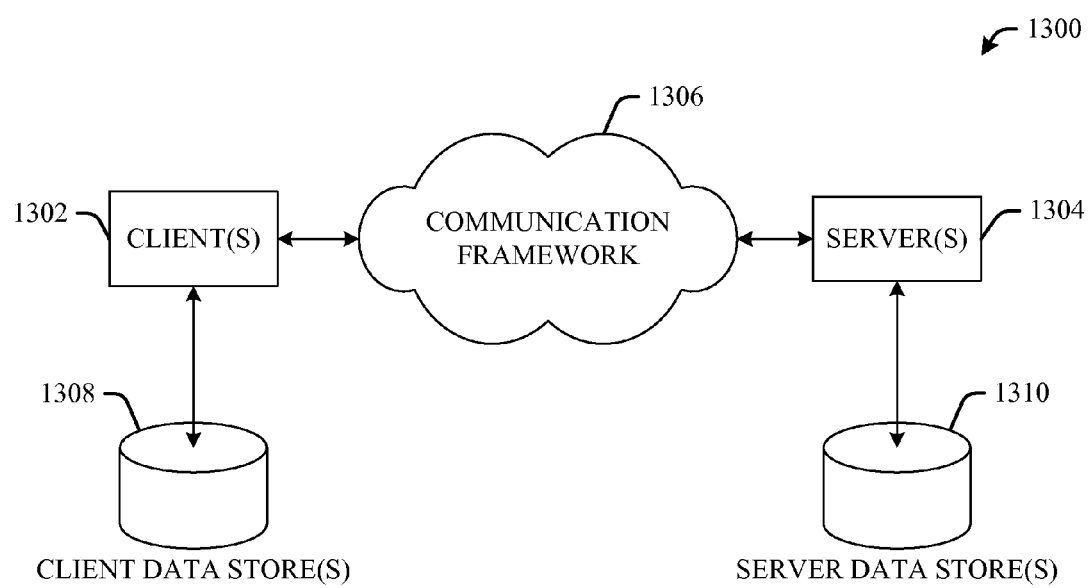
FIG. 13 illustrates a schematic block diagram of an exemplary computing environment in accordance with the subject innovation.

Referring now to FIG. 13, there is illustrated a schematic block diagram of an exemplary computing environment 1300 in accordance with the subject innovation. The system 1300 includes one or more client(s) 1302. The client(s) 1302 can be hardware and/or software (e.g., threads, processes, computing devices). The client(s) 1302 can house cookie(s) and/or associated contextual information by employing the innovation, for example.

The system 1300 also includes one or more server(s) 1304. The server(s) 1304 can also be hardware and/or software (e.g., threads, processes, computing devices). The servers 1304 can house threads to perform transformations by employing the innovation, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
at least one processor; and
at least one computer-readable storage medium storing instructions executable by the at least one processor to implement:
a scheduling application defining at least one calendar appointment entry having a start time and a finish time,
a communication management component defining an interruptibility rule separately from the at least one calendar appointment entry, and correlating the interruptibility rule to the at least one calendar appointment entry, and
a communication routing component configured to:
save, to a network server component, the at least one calendar appointment entry with the correlated interruptibility rule,
publish, via the network server component, the at least one calendar appointment entry and the correlated interruptibility rule to at least one participant of the at least one calendar appointment entry,
in response to a participant of the at least one participant accepting the published at least one calendar entry:
associate the published at least one calendar appointment entry and the correlated interruptibility rule to the participant, and
impose, during a period of time associated with a start time and a finish time of the published calendar appointment entry, the correlated interruptibility rule with respect to handling incoming communication for any of the at least one participant that accepted a published calendar appointment entry, and
route, according to the correlated interruptibility rule, the incoming communication of the participant that accepted the published calendar appointment entry during the period of time.

2. The system of claim 1, wherein the communication management component enables association of the interruptibility rule to a category, and wherein the category being available to associate the interruptibility rule to additional calendar appointment entries within the scheduling application.

3. The system of claim 2, the scheduling application being configured to enable access of the category by the at least one participant of the at least one calendar appointment entry such that the category is displayed to the at least one participant of the at least one calendar appointment entry with respect to the at least one calendar appointment entry.

4. The system of claim 1, the communication management component being configured to enable definition of the interruptibility rule.

5. The system of claim 1, the communication management component being configured to employ one of rules-based or inference-based logic to automatically define the interruptibility rule.

6. The system of claim 1, wherein the computer-readable storage medium has further instructions stored thereon to provide a graphical user interface (GUI) configured to facilitate one of creation and modification of the interruptibility rule.

7. The system of claim 1, the communication management component comprising:
an analysis component configured to evaluate one of context and content of the incoming communication; and
a category determination component configured to establish a category based upon the analysis, the category to be employed to route the incoming communication based on the associated interruptibility rule.

8. The system of claim 7, further comprising an association logic component configured to map the category to the interruptibility rule.

9. The system of claim 8, the association logic component further comprising a machine learning & reasoning (MLR) component configured to employ at least one of a probabilistic and a statistical-based analysis configured to infer call routing based at least in part upon calendar appointment event type or associated category.

10. A computer-implemented method comprising:
defining an interruptibility rule including at least one routing rule;
defining at least one calendar appointment entry including a start time and a finish time in a scheduling application;
associating the interruptibility rule to the at least one calendar appointment entry in the scheduling application;
saving to a network server component, the at least one calendar appointment entry with the associated interruptibility rule;
publishing, via the network server component, the at least one calendar appointment entry and the associated interruptibility rule to at least one participant of the at least one calendar appointment entry;
in response to a participant of the at least one participant accepting the published at least one calendar entry:
associating the published at least one calendar appointment entry and the associated interruptibility rule to the participant; and
imposing, during a period of time associated with a start time and a finish time of the published calendar appointment entry, the associated interruptibility rule with respect to handling incoming communication for any of the at least one participant that accepted a published calendar appointment entry; and
routing, according to the associated interruptability rule, the incoming communication of the participant that accepted the published calendar appointment entry during the period of time.

11. The method of claim 10, further comprising:
based on the interruptibility rule, redirecting the incoming communication from a first device to a second device different from the first device.

12. The method of claim 10, further comprising:
analyzing the incoming communication; and
applying the analysis as a function of the interruptibility rule.

13. A computer-readable storage medium storing instructions, the instructions configured to:
define, within a scheduling application, a calendar appointment entry including a time period having a start time and a finish time;
define an interruptibility rule separately defined from the calendar appointment entry;
associate the interruptibility rule with the calendar appointment entry;
save, to a network server component, the calendar appointment entry with the associated interruptibility rule;
publish, via the network server component, the calendar appointment entry and the associated interruptibility rule to at least one participant of the calendar appointment entry;
in response to a participant of the at least one participant accepting the published at least one calendar entry:

associate the published at least one calendar appointment entry and the associated interruptibility rule to the participant; and impose, during a period of time associated with a start time and a finish time of the published calendar appointment entry, the associated interruptibility rule with respect to handling incoming communication for any of the at least one participant that accepted a published calendar appointment entry; and route, according to the associated interruptability rule, the incoming communication of the participant that accepted the published calendar appointment entry during the period of time.

14. The computer-readable storage medium of claim 13, the instructions further configured to:

define a category that classifies the interruptibility rule;

associate the category to the calendar appointment entry; and render the association of the category to the calendar appointment entry.

15. The computer-readable storage medium of claim 14, the instructions further configured to:

associate the category to a plurality of disparate calendar appointment entries within the scheduling application; and via the category, map the interruptibility rule to each of the plurality of disparate calendar appointment entries.

16. The computer-readable storage medium of claim 14, the instructions further configured to define or infer the interruptibility rule.

* * * * *